US006973030B2

(12) United States Patent
Pecen et al.

(10) Patent No.: US 6,973,030 B2
(45) Date of Patent: Dec. 6, 2005

(54) METHOD AND APPARATUS FOR CONTROLLING MULTIPLE LOGICAL DATA FLOW IN A VARIABLE DATA RATE ENVIRONMENT

(75) Inventors: Mark Edward Pecen, Palatine, IL (US); Niels Peter Skov Andersen, Roskilde (DK); Kenneth Stewart, Grayslake, IL (US); Lawrence Alan Willis, McHenry, IL (US)

(73) Assignee: Motorola, Inc., Schaumburg, IL (US)

( * ) Notice: Subject to any disclaimer, the term of this patent is extended or adjusted under 35 U.S.C. 154(b) by 673 days.

(21) Appl. No.: 09/885,802

(22) Filed: Jun. 20, 2001

(65) Prior Publication Data

US 2002/0199008 A1    Dec. 26, 2002

(51) Int. Cl.⁷ ............................................... H04L 12/26

(52) U.S. Cl. ....................................... 370/229; 370/349

(58) Field of Search ................................ 370/229, 230, 370/230.1, 231, 235, 236, 311, 328, 329, 370/330, 345, 349, 395.2, 395.21, 395.3, 370/395.31, 395.32

(56) References Cited

U.S. PATENT DOCUMENTS

| | | | | |
|---|---|---|---|---|
| 4,586,134 A | * | 4/1986 | Norstedt ..................... | 709/228 |
| 6,665,280 B2 | * | 12/2003 | Forssell et al. ............ | 370/329 |
| 6,711,141 B1 | * | 3/2004 | Rinne et al. ............... | 370/328 |
| 6,760,305 B1 | * | 7/2004 | Pasternak et al. ......... | 370/230 |

OTHER PUBLICATIONS

GSM-02.60, "Digital cellular telecommunications system (Phase 2+); General Packet Radio Service (GPRS); Service Description; Stage 1", (European Telecommunications Standards Institute, (ETSI) Global System for Mobile Communications (GSM) specifications).

(Continued)

Primary Examiner—Kwang Bin Yao
(74) Attorney, Agent, or Firm—Randall S. Vaas

(57) ABSTRACT

A method and apparatus that enables incremental control the flow of downlink data on an external interface-by-interface basis, reducing the risk of repeatedly exhausting internal memory resources. A mobile device (300), having a plurality of device interfaces (328–330) for transmitting data received from a network (306) through a network controller (302), includes an identity associating layer (322) that associates identifiers with packet data protocol contexts corresponding to the plurality of device interfaces. A general resource indicator (334) generates a first indication in response to system memory of the mobile device being substantially exhausted, and a private resource indicator (336) generates a second indication in response to private resources corresponding to the plurality of device interfaces being substantially exhausted. A control processing unit (332) generates a flow control indication signal in response to the first indication, the second indication, flow control information corresponding to the plurality of interfaces, and the identifiers associated by the identity associating layer. A bit-map generator (338) generates a bit-map, based on the flow control indication signal, that is transmitted to the radio network controller, which interprets the bit-map to discretely control transmission of data from the radio network controller to the plurality of device interfaces.

17 Claims, 8 Drawing Sheets

OTHER PUBLICATIONS

GSM-03.60, "Digital cellular telecommunications system (Phase 2+); General Packet Radio Service (GPRS); Service Description; Stage 2", (European Telecommunications Standards Institute, (ETSI) Global System for Mobile Communications (GSM) specifications).

3GPP 25.301, "3rd Generation Partnership Project: Technical Specification Group Radio Access Network; Radio Interface Protocol Architecture", (3rd Generation Partnership Project 3GPP); Technical Specification (TS)).

3GPP 25.848, "3rd Generation Partnership Project; Technical Specification Group Radio Access Network; High Speed Downlink Packet Access (HSDPA)", (3rd Generation Partnership Project (3GPP); Technical Report (TR)).

GSM-05.01, "Digital cellular telecommunications system (Phase 2+); Physical Layer on the Radio Path; General Description", (European Telecommunications Standards Institute, (ETSI) Global System for Mobile Communications (GSM) specifications).

3GPP 23.060, "3rd Generation Partnership Project; Technical Specification Group Services and Systems Aspects: General Packet Radio Services (GPRS); Service Description; Stage 2", (3rd Generation Partnership Project (3GPP); Technical Specification (TS)).

* cited by examiner

-PRIOR ART-   *FIG.1*

METHOD AND APPARATUS FOR CONTROLLING MULTIPLE LOGICAL DATA FLOW IN A VARIABLE DATA RATE ENVIRONMENT

FIELD OF THE INVENTION

The present invention relates generally to data transfer, and in particular, the present invention relates to control of the flow of data over multiple user interface types between a mobile device and one or more user hosts.

BACKGROUND OF THE INVENTION

The General Packet Radio Service (GPRS) and Enhanced Data for Global Evolution (EDGE) for the Global System for Mobile Communications (GSM) system have introduced the capability of user data interchange within mobile wireless products. GPRS, and its superset, EDGE, permit the efficient use of radio and network resources when data transmission characteristics are i) packet based, ii) intermittent and non-periodic, iii) possibly frequent, with small transfers of data, e.g. less than 500 octets, or iv) possibly infrequent, with large transfers of data, e.g. more than several hundred kilobytes. User applications may include Internet browsers, electronic mail and so on. GPRS/EDGE radio access network (GERAN) is the real-time migration path for GPRS/EDGE into 3rd generation wireless.

FIG. 1 is a schematic diagram of an application environment of a mobile wireless device. Applications that utilize data transfer capabilities of GPRS/EDGE may be widely distributed over an application environment of a mobile wireless device. For example, certain applications may be internal to the user equipment device, such as an internal browser application, while others may reside on a remote host, such as a personal computer (PC), a personal digital assistant (PDA), an MP3 player, and so forth. In addition, the interconnection scheme employed to move data between the mobile wireless device and the remote host may vary substantially and exhibit distinctly different characteristics from one remote host to another remote host.

For example, as illustrated in FIG. 1, a user may have an electronic mail application resident on a PC host 100 that is connected to a mobile wireless device 102 by a physical serial data connection 104, such as an RS232 connection for example, while at the same time a calendar application resides on a PDA host 106 connected to the mobile wireless device 102 using an infrared data association (IrDA) interface 108 and its associated link control logic, or an audio application resides on an MP3 player host 110 connected to the mobile wireless device 102 using a radio frequency (RF) wireless local link 112, such as HomeRF or Bluetooth. Other types of mobile wireless device to host interfaces may be utilized as well, such as such as a universal serial bus (USB), or Ethernet connection, each of which have distinctly differing data transfer characteristics including different data rates and isochronicity.

These variances in actual data rates over multiple interface types between the mobile wireless device 102 and the multiple user hosts 100, 106 and 110, along with the requirement for mobile user terminals to support higher data rates in the near future, tend to be problematic in that progressively higher downlink data transfer rates, combined with the extreme variability of the external device interfaces cause internal memory resources of the mobile wireless device 102 to be repeatedly exhausted. Repeated exhaustion of memory resources results in a cascading effect of data protocol timeouts, resetting of transport protocol congestion window sizes and the initiation of controlled transmission roll-back and re-start. The repetition of these unnecessary procedures seriously impacts the downlink data throughput since the radio frequency (RF) link between the network and the mobile wireless device is overburdened with wasted data. In addition, it is desirable that a discontinuity of data flow to one external device does not impact the data throughput or resource availability to all other external devices, and/or internal applications to which the mobile user equipment is connected.

Current GPRS implementation does not address this problem at all, but rather relies on the host application to provide feedback to the application or server at the other end in order to control the flow of downlink data. For example, some applications provide repeated acknowledgements at the transport layer when operating in a "stream-oriented" mode with Transmission Control Protocol (TCP). In addition, the self-clocking TCP acknowledgements serve to regulate the flow somewhat, but also may cause other problems with regard to the TCP congestion window, the operation of which is designed for the wireline environment. Any delay in acknowledgement beyond a certain reasonable amount makes the sending TCP think that there is congestion on the network, i.e. that the routers between the two hosts have run out of packet queues. TCP then resets its window size to 1 stops sending and waits a pseudo-random time period to enable the router queues to flush. This severely impacts data flow, e.g. by more than one and at times 2 orders of magnitude.

In the case of an unacknowledged transport layer protocol, such as the User Datagram Protocol (UDP), the mobile user equipment would not "clock" the sender at all, and any excess data beyond the available resources of the mobile user equipment is simply thrown away. Due to the latency encountered in accessing a wireless packet data network, and the fact that the proposed new higher data rates on the downlink are expected to be many times faster than the ability for the application to signal the far end on the uplink, the mobile wireless device is likely to exhaust itself of memory resources before the far end even receives any flow control information.

Accordingly, what is needed is a method and apparatus for enabling improved flow control over multiple data streams between a mobile wireless device and a network.

BRIEF DESCRIPTION OF THE DRAWINGS

The features of the present invention which are believed to be novel are set forth with particularity in the appended claims. The invention, together with further objects and advantages thereof, may best be understood by making reference to the following description, taken in conjunction with the accompanying drawings, in the several figures of which like reference numerals identify like elements, and wherein:

DETAILED DESCRIPTION OF THE PREFERRED EMBODIMENT

The present invention is a method and apparatus that efficiently enables a mobile wireless device to incrementally control the flow of downlink data on an external interface-by-interface basis, reducing the risk of repeatedly exhausting internal memory resources. A data stack of a mobile device, having a plurality of device interfaces for transmitting data received from a network through a network controller, includes an identity associating layer that associates identifiers with packet data protocol contexts corresponding to the plurality of device interfaces. A general resource indicator generates a first indication in response to system memory of the mobile device being substantially exhausted, and a private resource indicator generates a second indication in response to private resources corresponding to the plurality of device interfaces being substantially exhausted. A control processing unit generates a flow control indication signal in response to the first indication, the second indication, flow control information corresponding to the plurality of interfaces, and the identifiers associated by the identity associating layer. A bit-map generator generates a bit-map, based on the flow control indication signal, that is transmitted to the radio network controller, which interprets the bit-map to discretely control transmission of data from the radio network controller to the plurality of device interfaces.

Figure 1:
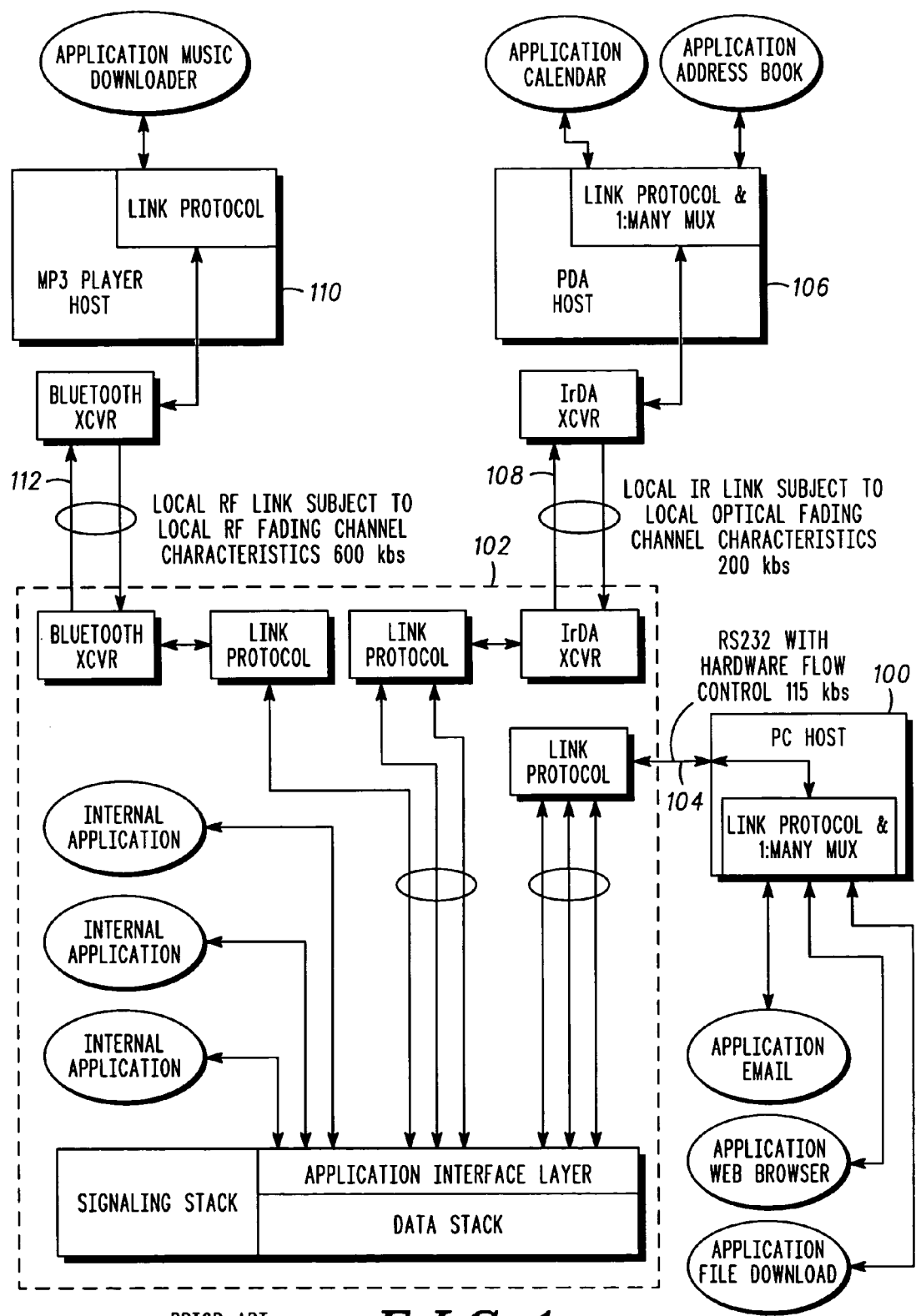
FIG. 1 is a schematic diagram of an example of an application environment of a mobile wireless device.
Figure 2:
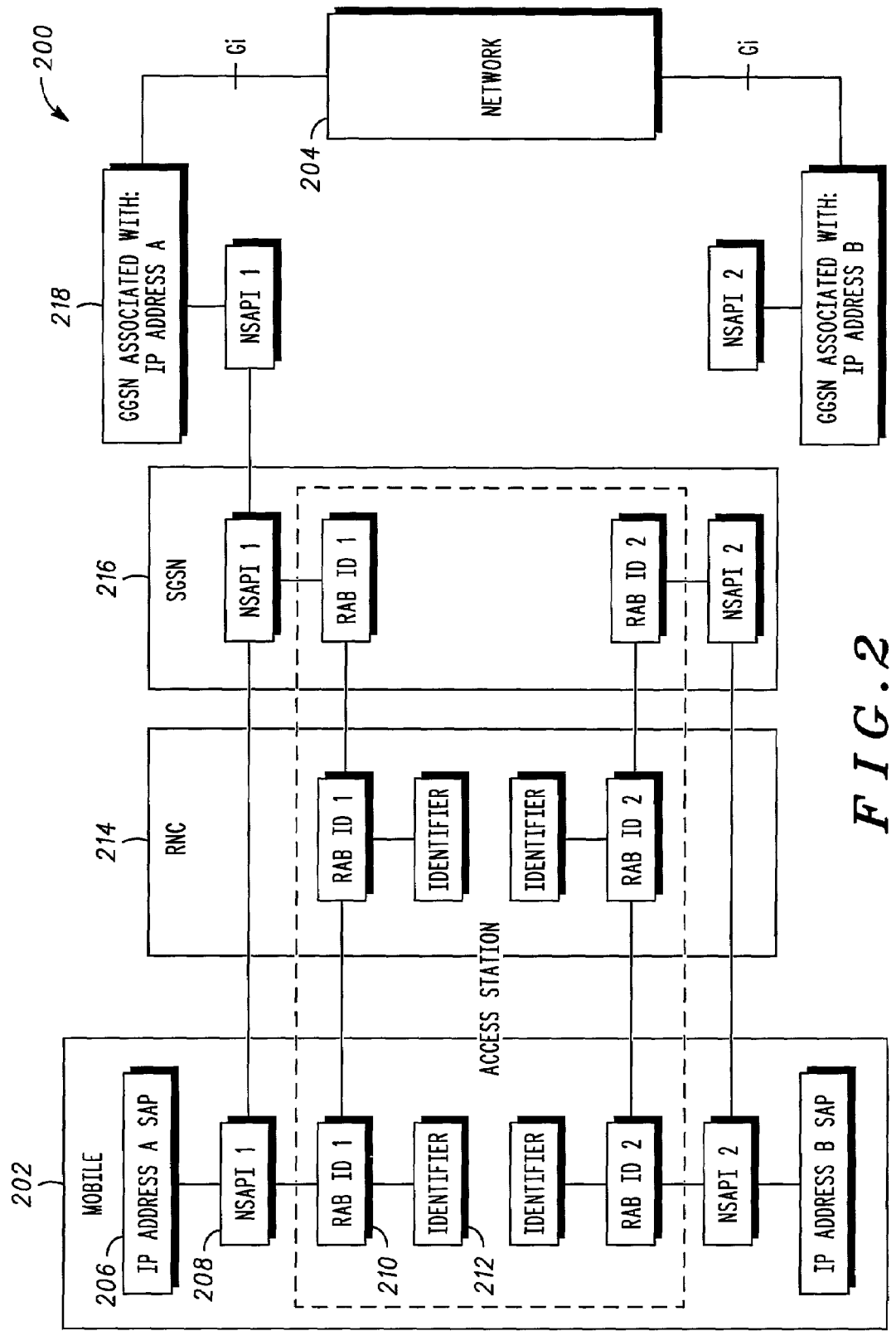
FIG. 2 is a schematic diagram of multiple logic data flow control in a communication system.

FIG. 2 is a schematic diagram of multiple logic data flow control in a communication system. As illustrated in FIG. 2, in a communication system including both a universal mobile telephone system (UMTS) terrestrial radio access network (UTRAN) platform and a GERAN platform environment, for example, commonly referred to as a UTRAN/GERAN communication system 200, control information is exchanged between a mobile device 202 and a network 204 to enable transmission of data between mobile device 202 and network 204. One technique for handling different types of data communication between mobile device 202 and network 204 is to provide a different radio bearer for each service. The radio bearer, which provides the capability for information transfer over a radio interface and is characterized by attributes such as information transfer rate (i.e., bit rate or throughput) and delay requirements, etc., is identified by a radio bearer identity.

For example, as illustrated in FIG. 2, according to the present invention, each internet protocol address service access point 206 associated with mobile device 202 is identified by a network service access point identifier (NSAPI) 208, which is in turn is logically bound to a radio access bearer identification (RAB-ID) 210. In both a UTRAN platform environment and a GERAN platform environment, for example, a packet data protocol (PDP) context identification is bound to radio access bearer identity (RAB-ID) 210, which indirectly identifies both the corresponding network service access point identifier 208 and an identifier 212 associated with the data identified by the packet data protocol context. For example, identifier 212 could be a radio bearer identity (RB-ID), or a packet flow identifier.

Using this association, the mobile device 202 associates the data stream information, associated with a certain packet data protocol context, with radio bearer identity information corresponding to the mobile device 202. As illustrated in FIG. 2, radio bearer identity 212 is mapped to a corresponding position in a flow control bit map that is transmitted from mobile device 202 to network 204 through a radio network controller 214, a serving GSM support node 216, and a gateway GPRS support node 218 associated with the IP address, so that radio network controller 214 has access to radio bearer identity 212.

A GSM GPRS/EDGE environment differs slightly from a UTRAN/GERAN environment in that radio access bearer identity (RAB-ID) 210 indirectly identifies both the corresponding network service access point identifier 208 and a packet flow identifier identifying a temporary block flow, rather than radio bearer identity (RB-ID) 212. As a result, in a GPRS/EDGE environment, packet flow identifier is mapped to a corresponding position in a flow control bit map that is transmitted from mobile device 202 to network 204 through radio network controller 214, serving GSM support node 216, and gateway GPRS support node (GGSN) 218 associated with the IP address, so that radio network controller has access to the packet flow identifier.

As will be described below, the present invention utilizes the association of an identifier, such as the radio bearer identity in a UTRAN/GERAN communication system, for example, or the packet flow identifier in a GSM GPRS/EDGE communication system, to each packet data protocol context to provide fine flow control, enabling the starting and stopping of data flow associated with each packet data protocol context in radio layers without having to signal back over multiple interfaces to upper network elements, such as serving GPRS support node 216 and gateway GPRS support node 218.

Figure 3:
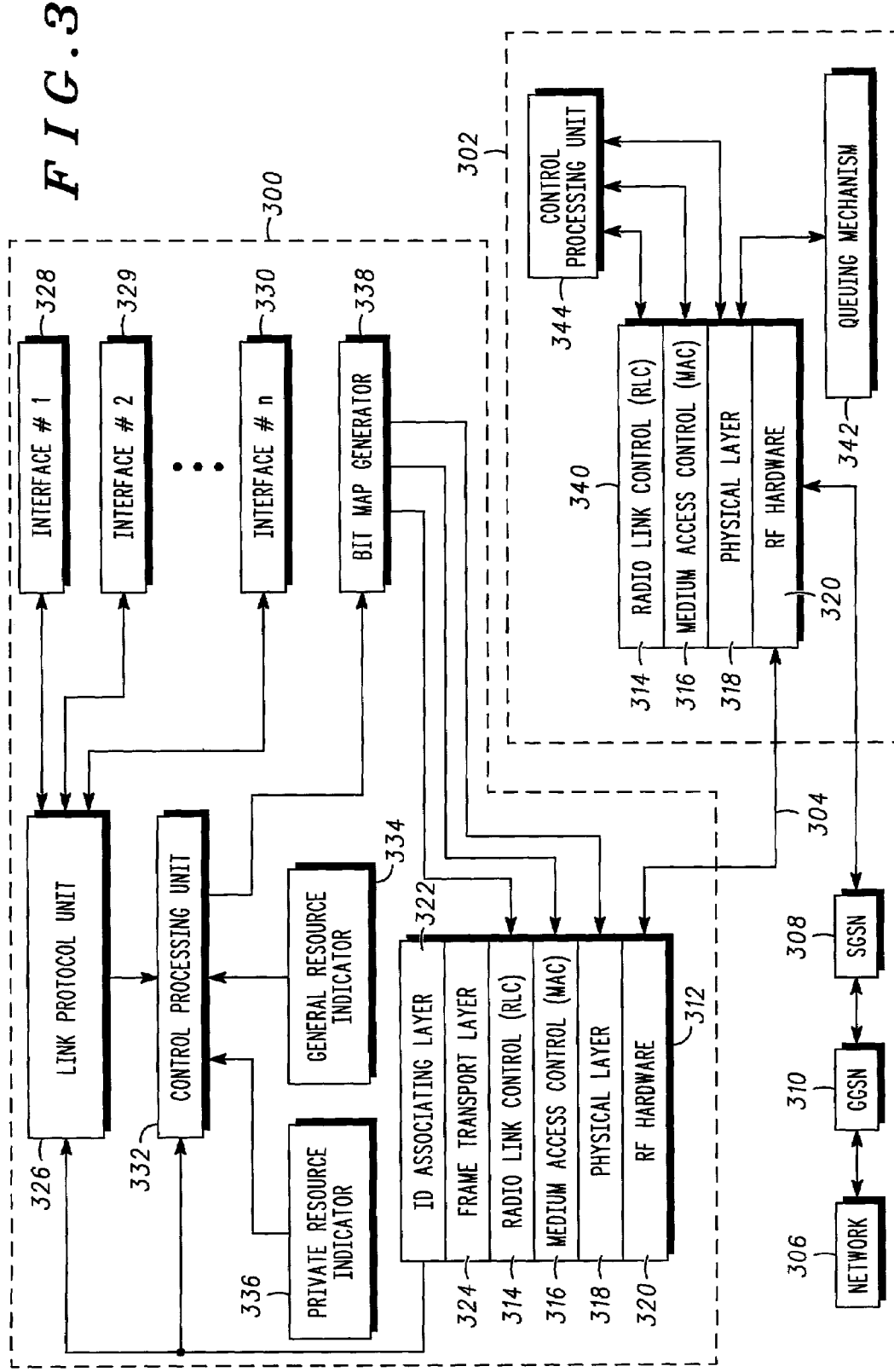
FIG. 3 is a schematic diagram of multiple logic data flow control in a variable data environment according to the present invention.

FIG. 3 is a schematic diagram of multiple logic data flow control in a variable data environment according to the present invention. As illustrated in FIG. 3, according to the present invention, a communication system, such as a UTRAN/GERAN communication system or a GSM GPRS/EDGE communication system, for example, includes a wireless mobile device 300, such as a radiotelephone or other wireless communication device, coupled to a radio network controller 302 along a radio frequency (RF) interface 304. Mobile device 300 exchanges data with a network 306 through radio network controller 302, a serving GPRS support node (SGSN) 308 and a gateway GPRS support node (GGSN) 310.

A data stack 312 located within mobile device 300 includes hierarchically related control layers, such as a radio link control (RLC) layer 314, a medium access control (MAC) layer 316, a physical layer 318, and a radio frequency (RF) hardware layer 320. In addition, data stack 312 includes an identity associating layer 322 and a frame transport layer 324. In a UTRAN/GERAN environment, identity associating layer 322 and frame transport layer 324 would correspond to a packet data protocol context/radio bearer identity associater and a packet data convergence protocol (PDCP) layer, respectively, while in a GSM GPRS/EDGE environment, identity associating layer 322 and frame transport layer 324 would correspond to a packet data protocol context/packet flow indentifier associater and a subnetwork convergence/divergence protocol (SNDCP), respectively.

A multiplexer and external device link protocol unit 326 receives one or more data streams from data stack 312 and multiplexes and directs the received data streams to corresponding one or more device interfaces 328–330 that are coupled to corresponding external hosts (not shown), such as a personal computer (PC), a personal digital assistant (PDA), or an MP3 player, for example, or that are internal to mobile device 300, such as an internal browser or e-mail application or the like. For example, multiplexer and external device link protocol unit 326 directs a data stream associated with a PDA connected to mobile device 300 at device interface 328, or directs a data stream associated with a PC connected to mobile device 300 at device interface 330, and so forth. It is understood that while three device interfaces are shown in FIG. 3, the present invention is intended to apply to any number of device interfaces.

Multiplexer and external device link protocol unit 326 also transmits flow control information received from the external devices via interfaces 328–330, such as an indication that the coupling with the external host has been corrupted or interrupted, or re-coupled after having been previously interrupted, to a control processing unit 332 on a per stream basis. In addition to the flow control information from link protocol unit 326, control processing unit 332 also receives packet data protocol context control data corresponding to device interfaces 328–330 generated by ID associating layer 322 that includes information related to identifiers associated with the packet data protocol context control data. According to the present invention, the identifiers correspond to radio bearer identities, for example, or a packet flow indicator.

In addition, a general resource availability indicator 334 transmits an indication to control processing unit 332 when system memory or process creation resources of mobile device 300 have been substantially exhausted, or have reached a "low-water mark". Similarly, an indication is transmitted from a private resource availability indicator 336 to control processing unit 332 when private resources, such as a per-packet data protocol context or per-external interface memory pool, have been substantially exhausted, or have reached a logical "low-water mark".

In this way, according to the present invention, control processing unit 332 receives an association of a packet data protocol context to an identifier from ID associating layer 322 that enables the present invention to identify and distinguish between separate data flow streams between each of device interfaces 328–330, along with status information, such as the availability of both private and system resources and flow control information forwarded from device interfaces 328–330, that would cause mobile device 300 to either disable or enable the flow of information to mobile device 300 from network 306, as will be described below. Based on the association of the packet data protocol context to the identifier and the status information received, control processing unit 332 transmits a flow control indication, containing the value of the identifier and instructions as to whether to suspend data flow in the downlink, to a flow control bit-map generator 338. Upon receipt of the flow control indication, bit-map generator 338 creates a flow control bit map for transmission to radio network controller 302 that properly reflects the control processing intentions of mobile device 300.

According to the present invention, the identifier associated with the packet data protocol context corresponds, for example, to radio bearer identity 210 in a UTRAN/GERAN system, and to a packet flow identifier in a GSM GPRS/EDGE system.

As illustrated in FIG. 3, radio network controller 302 includes a data stack 340, a queuing mechanism 342 and a control processing unit 344. Data stack 340 includes control layers that are hierarchically equivalent to corresponding control layers in data stack 312 of mobile device 300, such as radio link control layer 314, medium access control layer 316, physical layer 318 and RF hardware layer 320.

According to the present invention, depending upon the particular system requirements, the bit-map generated by bit-map generator 338 is transmitted along one of three logical paths to radio network controller 302. For example, bit-map may be transmitted along radio link control layer 314, medium access control layer 316, or physical layer 318, or multiple logical locations may be involved, depending on the specific implementation requirements that are to be considered.

Queuing mechanism 342 receives and organizes data transmitted from network 306 to radio network controller 302. Control processing unit 344 receives and interprets the bit-map values arriving from mobile device 300 along air interface 304, and enables or disables downlink data flow to mobile device 300 based on the information contained in the bit-map. For example, control of transmission of the downlink data from radio network controller 302 to mobile device 300 is dependent upon the bit-map values received by radio network controller 302 and their location in the received bit-map. The downlink data stream, which is transmitted from radio network controller 302 to mobile device 300 along air interface 304 when the bit-map values from mobile device 300 are interpreted by control processing unit 344 as instructing radio network controller 302 to enable the downlink data flow to the identified one of device interfaces 328–330, is directed by link protocol unit 326 to one of device interfaces 328–330. However, when the bit-map values are interpreted by control processing unit 344 as instructing the radio network controller 302 to disable the downlink data flow to interface 328, the downlink data flow remains within queuing mechanism 342 until control processing unit 344 subsequently receives bit-map values instructing that the downlink data flow to interface 328 be enabled.

Figure 4:
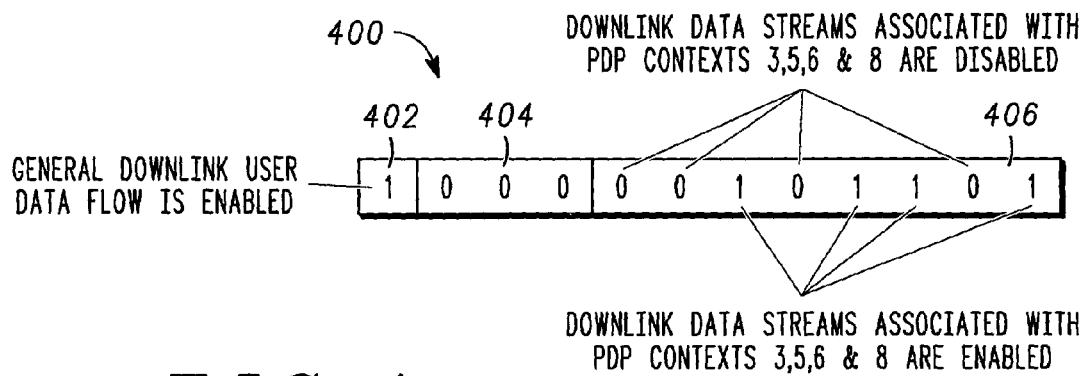
FIG. 4 is a schematic diagram of a flow control bit-map according to the present invention.

FIG. 4 is a schematic diagram of a flow control bit-map according to the present invention. As illustrated in FIGS. 3 and 4, a flow control bit-map 400 generated by bit-map generator 338 includes a global flow control bit 402 for stopping and starting downlink data flow associated with all packet data protocol contexts, an offset portion 404, and a flow control bit portion 406. Offset portion 404 is optional and contains offset bits 405, which, for example, may be utilized to expand the meaning of bits contained in a flow control bit portion 406. The bits located within flow control bit portion 406, which are utilized to represent packet data protocol context/identifier bindings, are set or cleared by mobile device 300 depending upon whether the associated data stream is to be enabled or disabled. Each of the bits contained within flow control bit portion 406 correspond to the identifier associated with a specific packet data protocol context, which according to a preferred embodiment of the present invention is limited to a maximum number of fourteen bits, i.e., seven bits in each direction. However, it is understood that any number of bits may be utilized. For example, according to the present invention, in a UTRAN/GERAN system, each of the bits in flow control bit portion 406 corresponds to the radio bearer identity of a specific packet data protocol context, for example, or to the packet flow identifier in a GSM GPRS/EDGE system As illustrated in FIGS. 3 and 4, based upon the information received from control processing unit 326, bit-map generator 332 generates bit-map 400 to enable incremental control of the flow of downlink data to device interfaces 328–330. In particular, according to the present invention, once a first host device is coupled to mobile device 300, such as when an MP3 player is coupled to device interface 328 via a local RF link, such as a Bluetooth connection for example, and corresponding data begins to be downloaded from network 306 to mobile device 300 for transmission to the MP3 player via device interface 328, ID associating layer 322 associates the packet data protocol context corresponding to the data flow with an identifier associated with the data identified by the packet data protocol context, such as a radio bearer identity, for example, or a packet flow identifier. The corresponding data flow stream is transmitted from ID associating layer 322 to link protocol unit 326, which directs the data flow to device interface 328, and control information corresponding to the identifier is transmitted from ID associating layer 322 to control processing unit 332.

Similarly, once a second host is coupled to mobile device 300, such when a PDA is coupled to device interface 329 via a local infrared link, for example, and corresponding data begins to be downloaded from network 306 to mobile device 300 for transmission to the PDA via device interface 329, ID associating layer 322 associates the packet data protocol context corresponding to the data flow with an identifier associated with the data identified by the packet data protocol context, such as radio bearer identity, for example, or a packet flow identifier. The corresponding data flow stream is transmitted from ID associating layer 322 to link protocol unit 326 which directs the data flow to device interface 329, and control information corresponding to the identifier is transmitted by ID associating layer 322 to control processing unit 332. This associating of the packet data protocol context corresponding to the data flow with an identifier associated with the data identified by the packet data protocol context is performed by ID associating layer 322 for each of device interfaces 328–330.

Upon receiving information corresponding to the identifier associated with the packet data protocol contexts corresponding to device interfaces 328–330, control processing unit 332 transmits a flow control indication signal containing the value of the identifier, i.e., the radio bearer identity or the packet flow identifier, for example, and an indication as to whether to enable or disable the associated data flow stream to bit-map generator 338. Mobile device 300 then transmits bit-map 400 generated by bit-map generator 338 to radio network controller 302 via one of control layers 314-318, depending upon the specific system requirements.

In this way, link protocol unit 326 transmits flow control information received on a per-data stream basis from device interfaces 328–330 to inform control processing unit 332 of congestion problems. Therefore, when congestion occurs at device interface 328, for example, such as when the coupling between the MP3 player host and device interface 328 is interrupted as a result of being momentarily moved outside the range of the local RF link, for example, link protocol unit 326 transmits flow control information informing of the interruption to control processing unit 322. Once control processing unit 332 subsequently receives an indication from private resource indicator 336 that corresponding resources have been exhausted and reached a logical "low-water mark", control processing unit 332 transmits an indication containing the corresponding identifier to bit-map generator 338, along with an instruction to disable the corresponding downlink data flow, i.e., to device interface 328. Bit-map generator 338 sets a bit representing the corresponding identifier of the associated packet data protocol context contained within flow control bit portion 406 of bit-map 400 to instruct radio network controller 302 to disable the data flow stream associated with that identifier. For example, according to the present invention, the data flow stream associated with the corresponding radio bearer identity, or with the corresponding packet flow identifier is disabled.

This process is performed for each of device interfaces 328–330 so that, for example, as illustrated in FIG. 4, if in addition to the first device interface, i.e., interface 328, control processing unit 332 indicates that the second, fourth and seventh device interfaces are also to be disabled and that the third, fifth, sixth and eighth device interfaces are to be enabled, bit-map generator 338 generates bit-map 400 so that flow control bit portion 406 of bit-map 400 contains an indication to disable downlink data streams associated with packet data protocol contexts corresponding to the first, second, fourth and seventh device interfaces and to enable downlink data streams associated with packet data protocol contexts corresponding to the third, fifth, sixth and eighth device interfaces, as illustrated in FIG. 4.

In addition, when there are excess processing activities taking place within mobile device 300 so that the entire resource availability of mobile device 300 is being occupied, making it desirable to disable the downlink data stream flow to mobile device 300 entirely, general resource indicator 334 sends an indication to control processing unit 332, which then transmits an indication to disable all downlink data streams to bit-map generator 338, which then sets global flow control bit 402 to disable.

Once transmitted over RF interface 304 from mobile device 300 to radio network controller 302, control processing unit 344 interprets bit-map 400 and enables or disables the downlink data flow to mobile device 300 based on the identifier corresponding to each of the bits located in flow control bit portion 406 of bit-map 400. For example, control processing unit 344 recognizes that the bit corresponding to the identifier associated with the data stream corresponding to device interface 328 is set to disable, and therefore disables the reading of data from queuing mechanism 342 corresponding to that data stream. The downlink data stream that is subsequently transmitted from network 306 continues to be inserted within queuing mechanism 342 until control processing unit 344 receives a next bit-map with an indication to enable the data stream flow corresponding to device interface 328. This enabling and disabling process is also performed for the remaining device interfaces 329–330. In addition, when control processing unit 344 recognizes that global flow control bit 402 of bit-map 400 has been set to disable, all downlink data flow streams corresponding to all identifiers, i.e., radio bearer identities or packet flow identifiers, are disabled.

In this way, the present invention provides mobile device 300 with discrete control of the transmission of data streams from radio network controller 302 to each of device interfaces 328–330, and therefore supports fine control over multiple data streams, enabling mobile device 300 to incrementally control the flow of downlink data on an external interface-by-interface basis. As a result, the present invention enables the individual control over multiple, logical data streams or sets of data streams, each of which may be associated with a specific interface between mobile device 300 and a local user host. Furthermore, the present invention provides more efficient utilization of resources associated with RF interface 304, since, by providing rapid reaction time and fine-control over downlink data arriving from network 306, the present invention reduces the amount of potentially wasted data that is transmitted over RF interface 304 so that mobile device 300 buffering resources are conserved and protected against overflow, thereby preventing data from being thrown away should buffering resources be all consumed in attempts to buffer large amounts of downlink data at peak transfer rates.

Figure 5A:
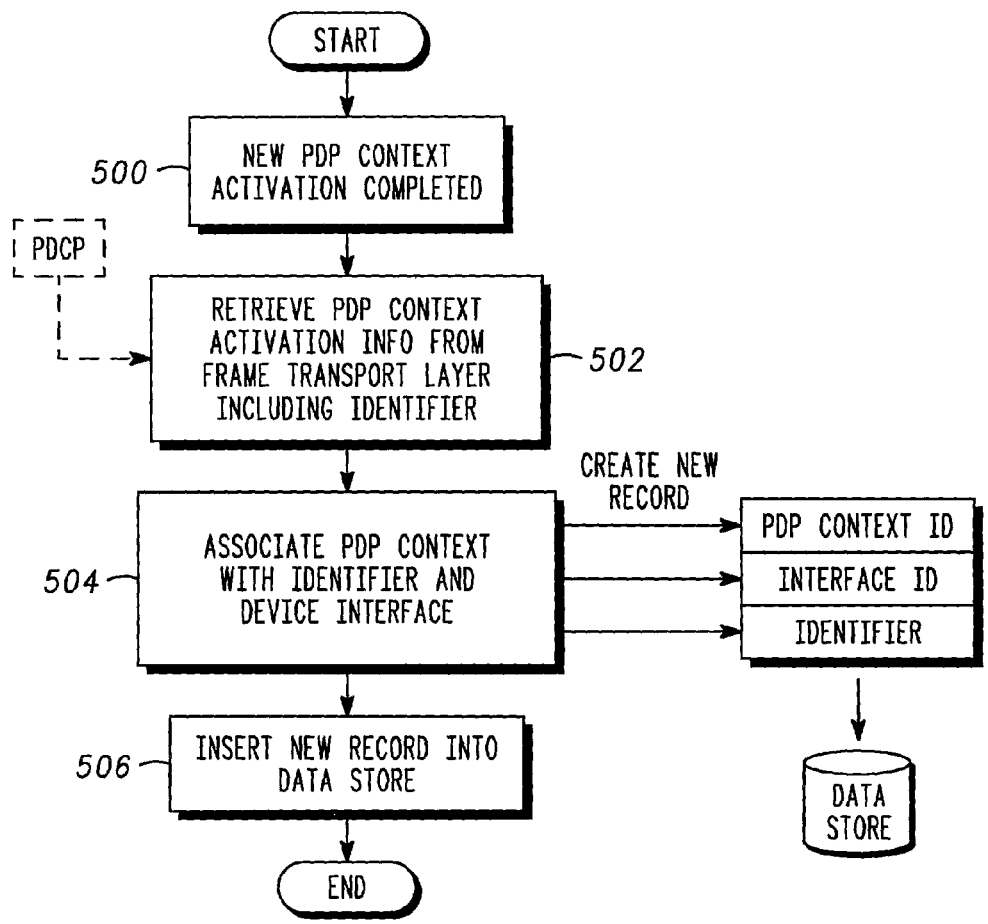
FIGS. 5A–5E are flowcharts of a method for controlling multiple logical data flow in a variable data rate environment according to the present invention.

FIGS. 5A–5E are flowcharts of a method for controlling multiple logical data flow in a variable data rate environment according to the present invention. As illustrated in FIGS. 3 and 5A, once a downlink data flow to one of device interfaces 328–330 is initiated, such as device interface 328 for example, and a new packet data protocol context activation is completed, Step 500, corresponding packet data protocol context activation information is retrieved by ID associating layer 322 from frame transport layer 324, including a packet data protocol context associated with the corresponding device interface, and a corresponding identifier, such as a radio bearer identity, for example, or a packet flow identifier, Step 502. A new packet data protocol context record is then created, Step 504, using the associated packet data protocol context and the identifier, and. includes a packet data protocol context ID and an associated identifier, such as a radio bearer identity, for example, or a packet flow identifier, along with an interface ID to bind the packet data protocol context ID and the associated identifier to one of device interfaces 328–330, which is then stored in a memory, Step 506.

Figure 5B:
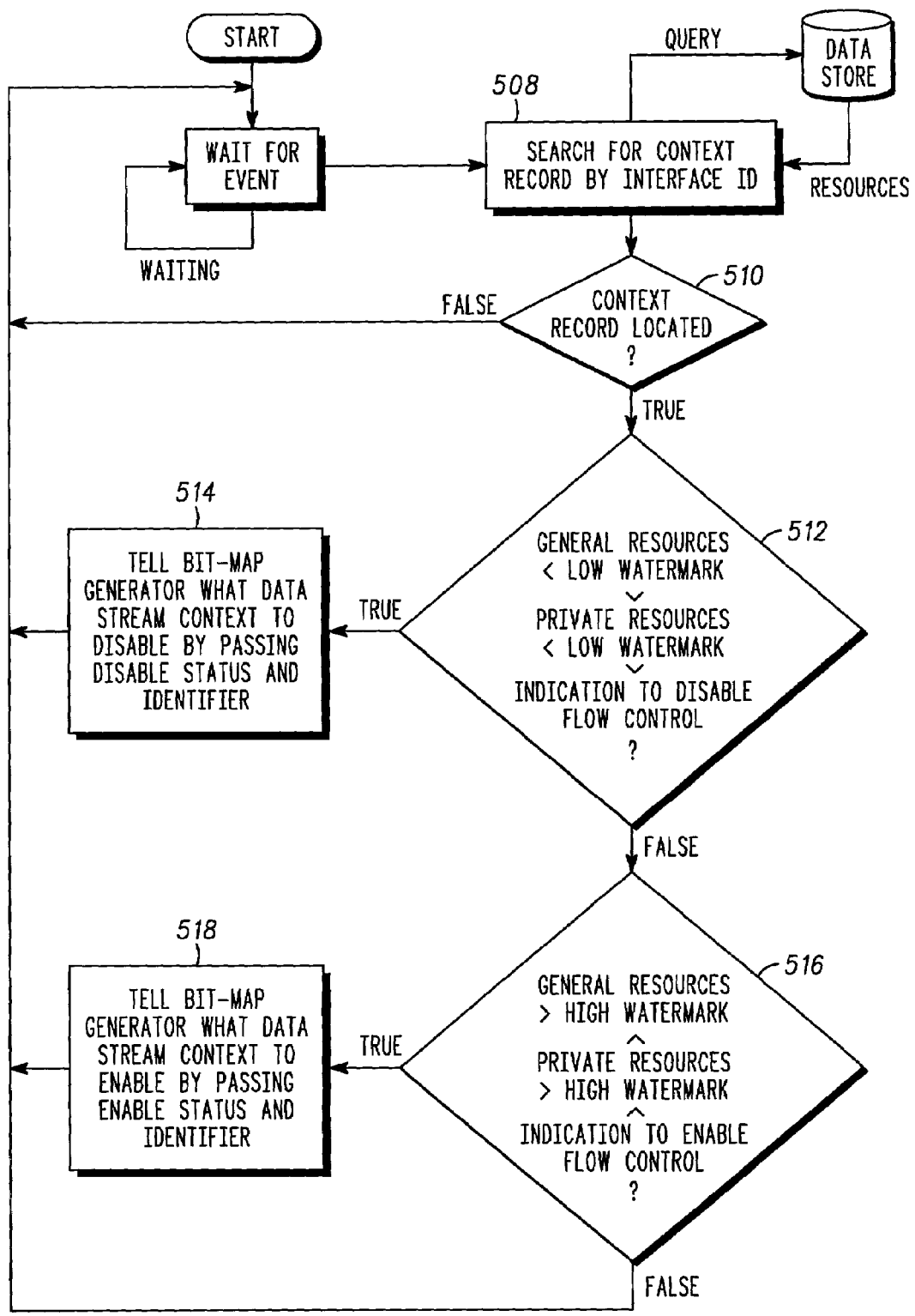

As illustrated in FIGS. 3 and 5B, once an event occurs, such as the coupling between mobile device 300 and one of device interfaces 328–330 being corrupted, control processing unit 322 searches for the packet data protocol context record using the interface ID, Step 508, and determines whether a corresponding record is located, Step 510. If a corresponding record is not located, control processing unit 332 waits for a next event. However, if a corresponding record is located, meaning an association has been previously made by ID associating layer 322, control processing unit 332 determines whether the general resources of mobile device 300 have been substantially exhausted, and whether resources associated with the corresponding one of device interfaces 328–300 has been substantially exhausted. For example, as illustrated in FIG. 5B, according to the present invention, control processing unit 322 determines whether an indication has been received from general resource indicator 334 that the general resources of mobile device 300 are less than a low water mark, or whether an indication has been received from private resource indicator 336 that resources associated with the corresponding one of device interfaces 328–330 are less than a low water mark. In addition, control processing unit determines whether an indication has been received from the one of device interfaces 328–330 to disable data flow to that device interface, Step 512.

If any one of the indications is received by control processing unit 332 in Step 512, control processing unit 332 transmits a flow control indication to bit-map generator 338 informing bit-map generator 338 which data flow stream to disable by including the DISABLE status and the corresponding identifier in the flow control indication, Step 514, and control processing unit 332 then waits for a next event.

However, if none of the indications is received by control processing unit 332 in Step 512, control processing unit 332 then determines whether an indication is received from general resource indicator 334 that the available general resources of mobile device 300 are greater than or equal to a high water mark, meaning an excess amount of resources are available for temporarily storing the downlink data flow, whether an indication is received from private resource indicator 336 that the available private resources of mobile device 300 associated with the one or more of device interfaces are greater than or equal to the high water mark, and whether an indication has been received from the one of device interfaces 328–330 to enable data flow control to that device interface, Step 516. If control processing unit 332 determines that one of the indications in Step 516 has not been received, control processing unit 332 waits for a next event. However, if control processing unit 332 determines that all of the indications in Step 516 has been received, control processing unit 332 transmits a flow control indication to bit-map generator 338 informing which data flow stream to enable by including the ENABLE status and the corresponding identifier in the flow control indication, Step 518, and control processing unit 332 then waits for a next event.

Figure 5C:
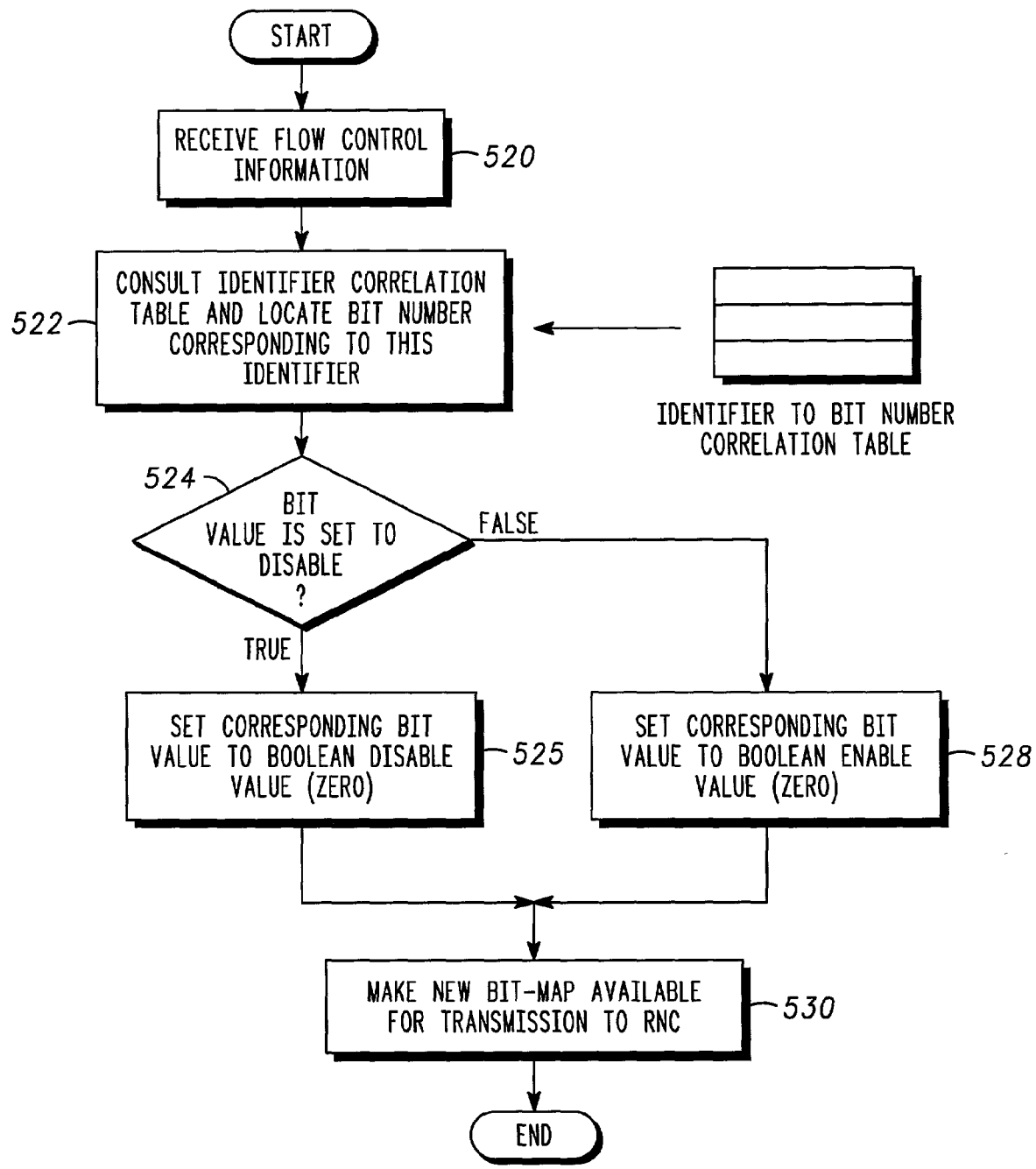

As illustrated in FIGS. 3 and 5C, once bit-map generator 338 receives one of the indications from control processing unit 332 described above in reference to FIG. 5B, Step 520, bit-map generator 338 then locates the bit within flow control bit portion 406 of bit-map 400 corresponding to the downlink flow to the corresponding one of device interfaces 328–330, Step 522. For example, according to the present invention, bit-map generator 338 consults a correlation table containing an identifier to bit-number correlation for bit-map 400 for each identifier received from control processing unit 332. Bit-map generator 338 then determines, for each identifier, whether the corresponding data flow stream is to be disabled, Step 524, based on the status information included with the flow control indication received, and sets the corresponding bit value of flow control bit portion 406 of bit-map 400 to a DISABLE value, zero for example, if flow is to be disabled, Step 526, and to an ENABLE value, one for example, if flow is to be enabled, Step 528. Once all values in bit-map have been set, the new bit-map is transmitted along RF interface 304 to radio network controller 302, Step 530.

Figure 5D:
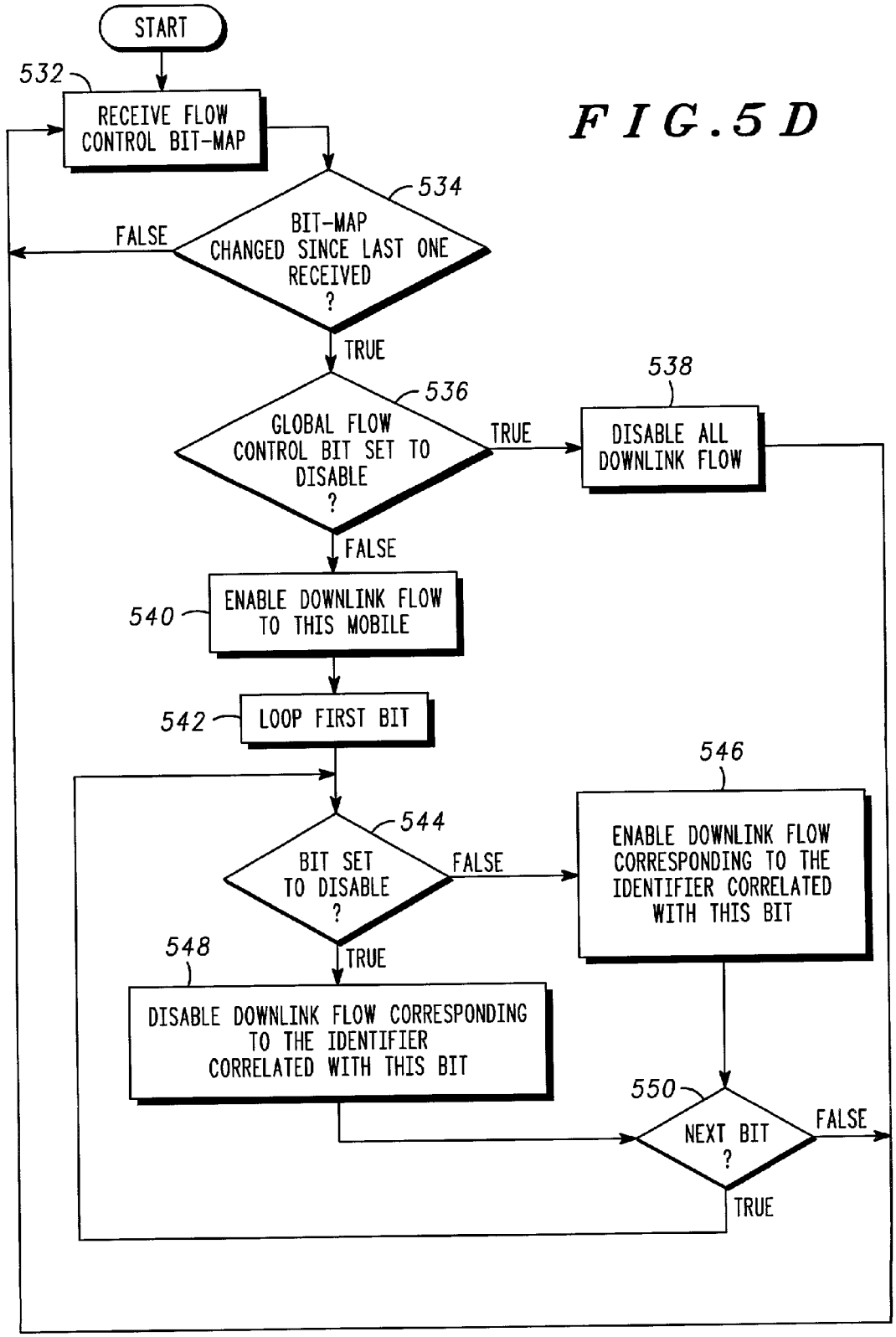

As illustrated in FIGS. 3 and 5D, once bit-map 400 is received at radio network controller 302, Step 532, control processing unit 344 makes a determination as to whether bit-map 400 has changed since last received, Step 534. If control processing unit 344 determines that bit-map 400 has not changed since last received, control processing unit 344 waits for receipt of a next bit-map 400, Step 532. If control processing unit 344 determines that bit-map 400 has changed since last received, control processing unit 344 then determines whether global flow control bit 402 of bit-map 400 has been set to DISABLE in bit-map 400, Step 536. If it is determined that global flow control bit 402 has been set to disable, control processing unit disables all downlink data flow streams to mobile device 300. However, if it is determined that global flow control bit 402 has not been set to DISABLE, control processing unit 344 enables downlink flow to mobile device 300, Step 540, and checks the first bit in flow control bit portion 406 of bit-map 400 and determines whether the bit is set to DISABLE, Step 544.

If it is determined in Step 544 that the bit is set to DISABLE, downlink data flow to mobile device 300 corresponding to the radio bearer, or corresponding to the packet flow identifier, associated with the identifier correlated with that bit is disabled, Step 548. However, if it is determined in Step 544 that the bit is not set to DISABLE, downlink data flow to mobile device 300 corresponding to the radio bearer, or corresponding to the packet flow identifier, associated with the identifier correlated with that bit is enabled, Step 546. The process then continues again using the next bit contained in flow control bit portion 406 of bit-map 400, Step 550, until Steps 544–548 have been performed for each bit in flow control bit portion 406.

Figure 5E:
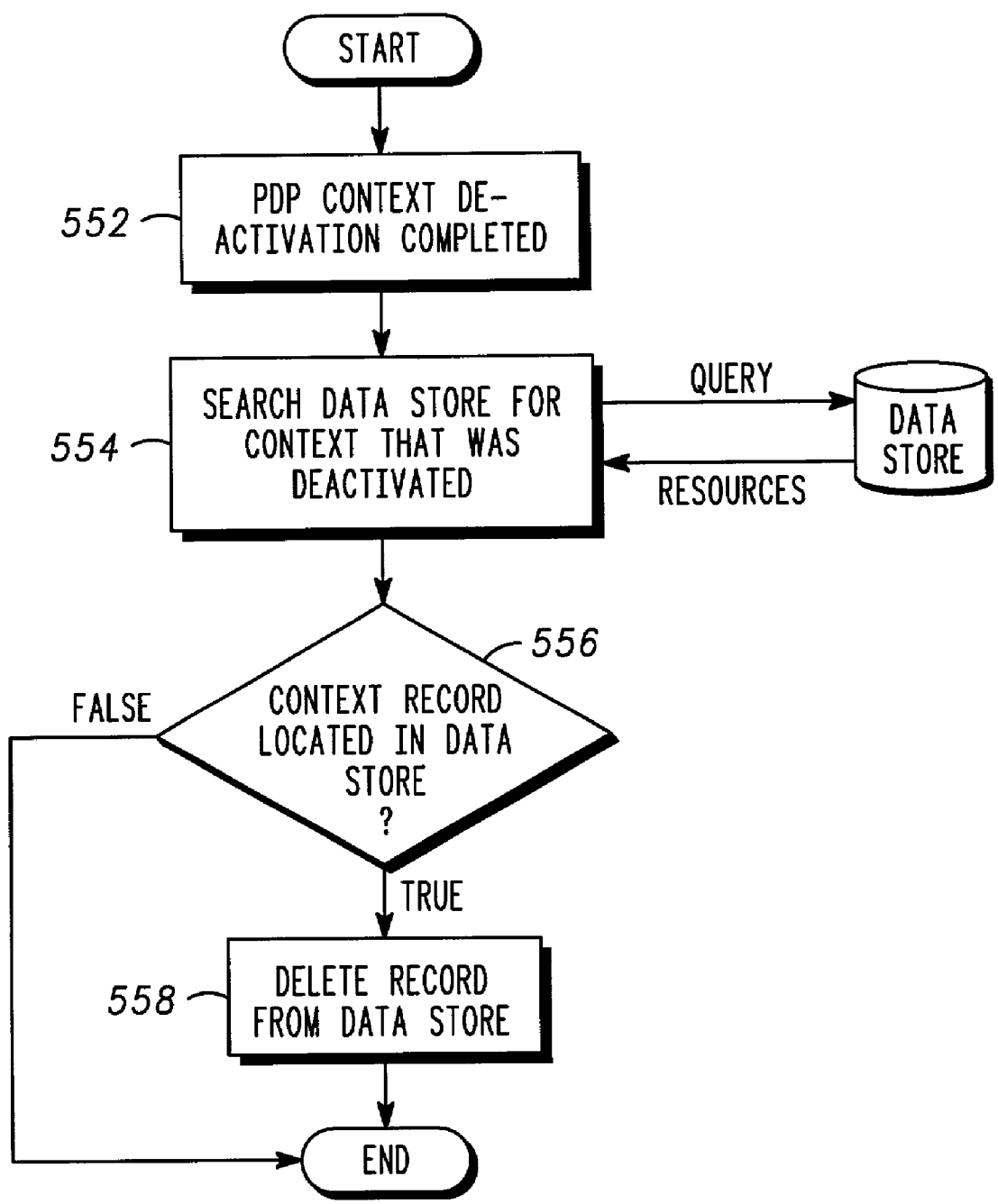

As illustrated in FIGS. 3 and 5E, once the downlink transmission has been completed and packet data protocol context deactivation is completed, Step 552, ID associating layer 322 locates and deletes the stored associated identifier, device interface ID, and packet data protocol context, Steps 554–558, so that the context record is deleted from the data store.

While a particular embodiment of the present invention has been shown and described, modifications may be made. It is therefore intended in the appended claims to cover all such changes and modifications which fall within the true spirit and scope of the invention.

What is claimed is:

1. A mobile device having a plurality of device interfaces for transmitting data received from a network through a network controller, the mobile device comprising:
   a data stack including an identity associating layer, the identity associating layer associating identifiers with packet data protocol contexts corresponding to the plurality of device interfaces;
   a general resource indicator generating a first indication in response to system memory of the mobile device being substantially exhausted;
   a private resource indicator generating a second indication in response to private resources corresponding to the plurality of device interfaces being substantially exhausted;
   a control processing unit generating a flow control indication signal in response to the first indication, the second indication, flow control information corresponding to the plurality of interfaces, and the identifiers associated by the identity associating layer; and a bit-map generator generating a bit-map, based on the flow control indication signal, discretely controlling transmission of data from the radio network controller to the plurality of device interfaces.

2. The mobile device of claim 1, wherein the bit-map generated by the bit-map generator comprises:
   a global flow control bit portion including the first indication; and
   a flow control bit portion including bits corresponding to association of the identifiers with the packet data protocol contexts.

3. The mobile device of claim 1, wherein the identifier corresponds to a radio bearer identity.

4. The mobile device of claim 1, wherein the identifier corresponds to a packet flow identifier.

5. The mobile device of claim 1, wherein the flow control information corresponds to an interruption of a coupling at one or more of the plurality of interfaces.

6. A communication system transmitting data between a mobile device and a network through a radio network controller, the mobile device directing the data to a plurality of interfaces, the communication system comprising:
   a data stack including an identifier associating layer associating identifiers with packet data protocol contexts corresponding to the plurality of interfaces;
   a general resource indicator, positioned in the mobile device, generating a first indication in response to system memory of the mobile device being substantially exhausted;
   a private resource indicator generating a second indication in response to private resources corresponding to the plurality of interfaces being substantially exhausted;
   a first control processing unit generating a flow control indication signal in response to the first indication, the second indication, flow control information corresponding to the plurality of interfaces, and the identifiers associated by the identity associating layer;
   a bit-map generator generating a bit-map based on the flow control indication signal; and
   a second control processing unit interpreting the bit-map generated by the bit-map generator and discretely controlling the transmission of the data from the radio network controller to the plurality of interfaces.

7. The communication system of claim 6, wherein the bit-map generated by the bit-map generator comprises:
   a global flow control bit portion including the first indication; and
   a flow control bit portion including bits corresponding to association of the identifiers with the packet data protocol contexts.

8. The communication system of claim 6, wherein the identifier corresponds to a radio bearer identity.

9. The communication system of claim 6, wherein the identifier corresponds to a packet flow identifier.

10. The communication system of claim 6, wherein the flow control information corresponds to an interruption of a coupling at one or more of the plurality of interfaces.

11. The communication system of claim 6, further comprising a queuing mechanism receiving and organizing the data transmitted from the network to the radio network controller, wherein, in response to the second control processing unit disabling transmission of one or more data streams from the radio network controller to the plurality of device interfaces, subsequent receipt of the one or more data streams by the radio network controller is inserted within the queuing mechanism.

12. A method for controlling multiple data flow between a mobile device and a network through a radio network controller, comprising the steps of:
   associating a packet data protocol context with a corresponding identifier;
   generating a flow control bit-map controlling transmission of the data flow to the mobile device, and transmitting the flow control bit-map from the mobile device to the radio network controller; and
   discretely controlling transmission of the data flow from the radio network controller to a plurality of interfaces within the mobile device;
   wherein the step of generating a flow control bit-map comprises the steps of:
   determining whether general resources of the mobile device have been substantially exhausted;
   determining whether resources associated with each of the plurality of device interfaces has been substantially exhausted; and
   determining whether an indication has been received from each the plurality of device interfaces to disable corresponding transmission of the data flow.

13. The method of claim 12, further comprising the step of determining whether the flow control bit-map has changed since receipt of a prior generated flow control bit-map.

14. The method of claim 12, wherein the identifier corresponds to a radio bearer identity.

15. The method of claim 12, wherein the identifier corresponds to a packet flow identifier.

16. The method of claim 12, wherein, in response to general resources of the mobile device being substantially exhausted, resources associated with the plurality of device interfaces being substantially exhausted, and an indication being received from the plurality of device interfaces to disable the transmission of the data flow, the corresponding data flow to each of the plurality of device interfaces is disabled.

17. The method of claim 16, wherein, in response to general resources of the mobile device not being substantially exhausted, resources associated with the plurality of device interfaces not being substantially exhausted, and an no indication being received from the plurality of device interfaces to disable the transmission of the data flow, the method further comprises the steps of:

determining whether excess general resources of the mobile device are available;

determining whether excess private resources associated with the plurality of device interfaces is available; and determining whether an indication has been received from each the plurality of device interfaces to enable corresponding transmission of the data flow.

* * * * *